(12) United States Patent
Bernhardt

(10) Patent No.: US 11,530,026 B2
(45) Date of Patent: *Dec. 20, 2022

(54) ENERGY SUBSYSTEMS INTEGRATED INTO STRUCTURAL COMPONENTS OF AN AIRCRAFT

(71) Applicant: THE BOEING COMPANY, Chicago, IL (US)

(72) Inventor: Roger D. Bernhardt, St. Louis, MO (US)

(73) Assignee: THE BOEING COMPANY, Chicago, IL (US)

( * ) Notice: Subject to any disclaimer, the term of this patent is extended or adjusted under 35 U.S.C. 154(b) by 322 days.

This patent is subject to a terminal disclaimer.

(21) Appl. No.: 16/437,729

(22) Filed: Jun. 11, 2019

(65) Prior Publication Data

US 2020/0391843 A1 Dec. 17, 2020

(51) Int. Cl.
*B64C 3/32* (2006.01)
*B64C 3/18* (2006.01)
*B64D 41/00* (2006.01)
*H01M 50/20* (2021.01)

(52) U.S. Cl.
CPC ............ *B64C 3/32* (2013.01); *B64C 3/185* (2013.01); *B64D 41/00* (2013.01); *H01M 50/20* (2021.01); *B64D 2221/00* (2013.01); *H01M 2220/20* (2013.01)

(58) Field of Classification Search
CPC . B64C 3/32; B64C 3/18; B64C 3/185; H01M 50/20; H01M 2220/20; B64D 41/00; B64D 2221/00; B64D 27/24; B64D 2211/00
See application file for complete search history.

(56) References Cited

U.S. PATENT DOCUMENTS 3,937,424 A * 2/1976 Meier .................. H01M 50/00
 244/53 R
5,810,284 A * 9/1998 Hibbs .................... B64D 27/24
 244/13

(Continued)

FOREIGN PATENT DOCUMENTS

EP 1070661 A2 1/2001
EP 3187422 A1 7/2017

(Continued)

OTHER PUBLICATIONS

European Patent Office, European Search Report for Application EP 20 17 1762, dated Oct. 14, 2020.

(Continued)

*Primary Examiner* — Philip J Bonzell
*Assistant Examiner* — Colin Zohoori
(74) *Attorney, Agent, or Firm* — Patterson + Sheridan, LLP

(57) ABSTRACT

The present disclosure provides a structural member for a vehicle. The structural member comprises a plurality of finned spar members interlocked with one another, wherein each of the finned spar members include a main body, a plurality of web members extending from a flange, a circuit board formed on the main body, and a bus bar formed on the main body, wherein a compartment is formed between adjacent web members, each compartment being sized to receive a battery.

21 Claims, 5 Drawing Sheets

(56) References Cited

U.S. PATENT DOCUMENTS

| | | | |
|---|---|---|---|
| 8,967,529 B1* | 3/2015 | Bennett | B64D 27/24 |
| | | | 244/53 R |
| 2018/0099756 A1* | 4/2018 | Gore | H01M 10/0525 |
| 2019/0296300 A1* | 9/2019 | Zimmermann | B64G 1/425 |

FOREIGN PATENT DOCUMENTS

| | | |
|---|---|---|
| EP | 3326917 A1 | 5/2018 |
| EP | 3544083 A1 | 9/2019 |
| JP | H0858617 A | 3/1996 |
| WO | 0175989 A2 | 10/2001 |

OTHER PUBLICATIONS

European Patent Office, Written Opinion for Application 20 171 762.6, dated Oct. 14, 2020.
European Patent Office, Communication Pursuant to Article 94(3) EPC for Application 20 171 762.6-1010 dated Jan. 27, 2022.

\* cited by examiner

ENERGY SUBSYSTEMS INTEGRATED INTO STRUCTURAL COMPONENTS OF AN AIRCRAFT

GOVERNMENT RIGHTS IN THIS INVENTION

This invention was made with government support under contract number FA8650-18-C-2807 awarded by the Department of Defense. The government has certain rights in this invention.

BACKGROUND

Aspects of the present disclosure provide methods and apparatus for onboard battery storage as well as onboard energy subsystems integrated into structural components of an aircraft.

Batteries and other elements of energy systems for aircraft or other vehicles are conventionally packaged as part of a payload of the aircraft or other vehicle. This conventional packaging typically includes batteries at least partially enclosed in an explosion-proof and/or fire-proof structure. Thus, the weight of the batteries as well as the structures containing the batteries add payload weight to the aircraft or other vehicle, which results in the need for more operational power in order to compensate for the additional power consumed due to the weight of energy system.

SUMMARY

The present disclosure provides methods and apparatus for onboard battery storage as well as onboard energy subsystems integrated into structural components of a vehicle, such as an aircraft.

In one implementation, a structural member for a vehicle is provided. The structural member comprises a plurality of finned spar members interlocked with one another, wherein each of the finned spar members include a main body, a plurality of web members extending from a flange, a circuit board formed on the main body, and a bus bar formed on the main body, wherein a compartment is formed between adjacent web members, each compartment being sized to receive a battery.

In another implementation, an aircraft spar is provided. The aircraft spar includes a plurality of finned spar members interlocked with one another. Each of the finned spar members include a main body, a plurality of web members extending from a flange, a circuit board formed on the main body, and a bus bar formed on the main body, wherein a compartment is formed between adjacent web members, each compartment being sized to receive a plurality of batteries.

In another implementation, an onboard energy subsystem for a vehicle is provided. The onboard energy subsystem comprises a structural member comprising a plurality of batteries. The structural member comprises a plurality of finned spar members interlocked with one another. Each of the finned spar members include a main body, a plurality of web members extending from a flange, a circuit board formed on the main body, and a bus bar formed on the main body, wherein a battery of the plurality of batteries is compressed in a compartment is formed between adjacent web members.

BRIEF DESCRIPTION OF THE DRAWINGS

So that the manner in which the above recited features of the present disclosure can be understood in detail, a more particular description of the disclosure, briefly summarized above, may be had by reference to aspects, some of which are illustrated in the appended drawings.

DETAILED DESCRIPTION

The present disclosure provides methods and apparatus for onboard battery storage as well as onboard energy subsystems integrated into structural components of a vehicle or craft, such an aircraft. The onboard energy system as described herein may be utilized in a spar or other structural member of an aircraft. The spar or other structural member as described herein may be utilized on any size of aircraft, such as a small remotely operated vehicle, a drone, or other similar aircraft, up to and including larger aircraft, such as narrow and wide body passenger aircraft. The onboard energy subsystems as described herein may be utilized to power engines, motors or any other electrical system of the aircraft during use.

Figure 1:
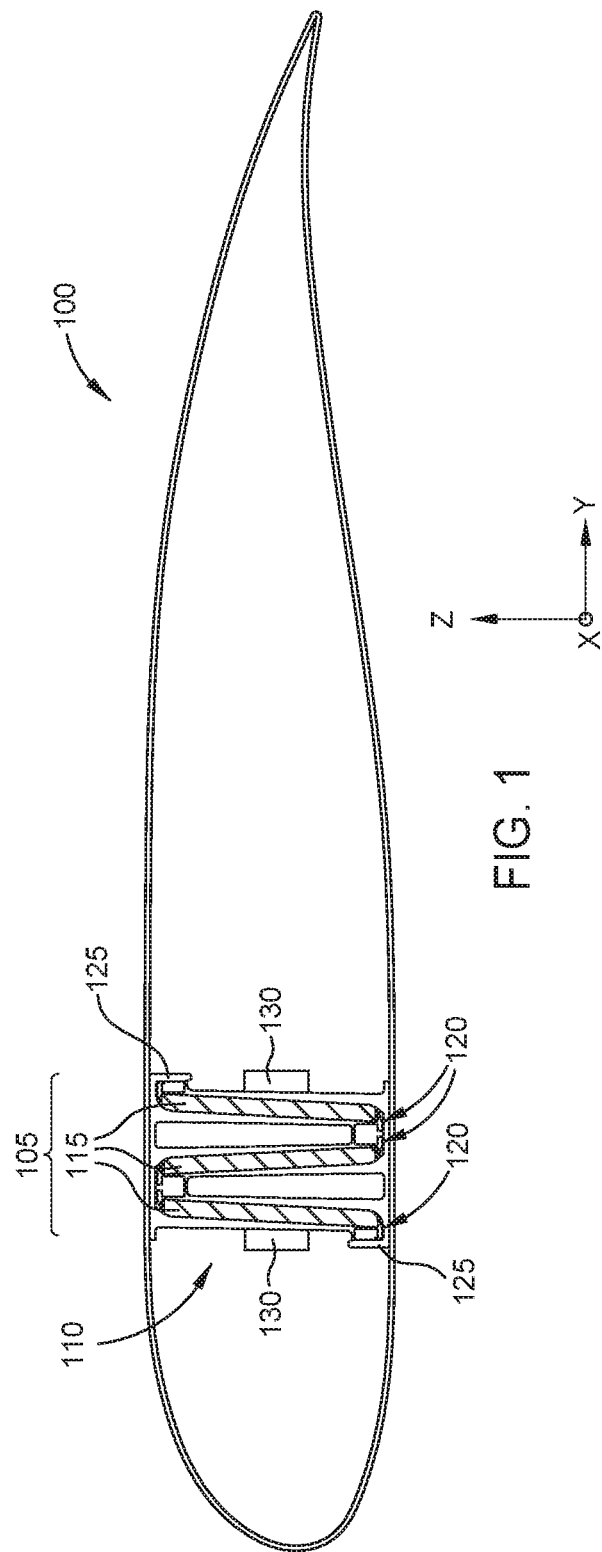
FIG. 1 is a schematic sectional view of a wing having one embodiment of a spar that structurally supports the wing.

FIG. 1 is a schematic sectional view of a wing 100 having one embodiment of a structural member, shown as a spar 105, which structurally supports the wing 100. The spar 105 runs along a portion of a length of the wing 100 (in the X direction) and couples to a support member of the aircraft (not shown) such as a frame of a fuselage of the aircraft. The wing 100 depicted in FIG. 1 may also be an empennage or vertical stabilizer having the spar 105 as a main or primary structural member.

The spar 105 in this embodiment comprises an onboard energy subsystem 110. The onboard energy subsystem 110 comprises a plurality of batteries 115 mounted in compartments 120 provided between a plurality of finned spar members 125. The compartments 120 and the finned spar members 125 are more clearly shown in FIGS. 2A and 2B.

Each of the plurality of finned spar members 125 are integrated together to form a main or primary structural member (e.g., the spar 105) for the wing 100. The plurality of finned spar members 125 are detachable to facilitate installation or removal of individual batteries 115 from the compartments 120. Each of the finned spar members 125 may be made of a polymer material, such as a thermoplastic material formed by a 3D printing or an extrusion process. In other embodiments, the finned spar members 125 may be made of a lightweight metallic material such as aluminum, or a composite material such as a polymer/carbon fiber composite.

In an example, each of the batteries 115 is a lithium-ion battery. In one example, the batteries 115 utilized in the onboard energy subsystem 110 are "pouch cells" and may be connected in series. In one particular example, the batteries 115 comprise six cells in a serial connection to produce 24 volts, and each six-cell pack is connected in parallel along the length of the spar 105 (in the X direction).

The batteries 115 may be small enough such that damage to an individual cell does not ignite or damage the spar 105 or the wing 100 as well as affect the operation of other batteries 115. For example, if one battery pouch is punctured or otherwise damaged, the accumulation of explosive gases within the pouch is not enough to cause an explosion or fire. In one example, each of the batteries 115 may be about 2 inches by about 2 inches.

The spar 105 may also include one or more power management devices 130. The power management devices 130 may be configured to control charging, short circuit protection, health monitoring, as well as other power management and/or battery maintenance utilities. Circuitry for the batteries 115 is provided in or on a portion of the finned spar members 125. An example of the circuitry of the onboard energy subsystem 110 is shown in FIGS. 2A, 2B and 3.

The plurality of finned spar members 125 are adapted to engage and provide slight pressure or compression against each of the batteries 115. The compression applied to the batteries 115 by the finned spar members 125 prevents degradation of the batteries 115. The compression of the batteries 115 against the finned spar members 125 also integrates the batteries 115 into structural members of the spar 105. For example, each of the compressed batteries is utilized for any structural strength therein due to the compression against the finned spar members 125. The compression effectively packs or loads the spar 105 such that structural strength thereof is enhanced as opposed to an uncompressed or a "loose" connection between the finned spar members 125 and the batteries 115.

Figure 2A:
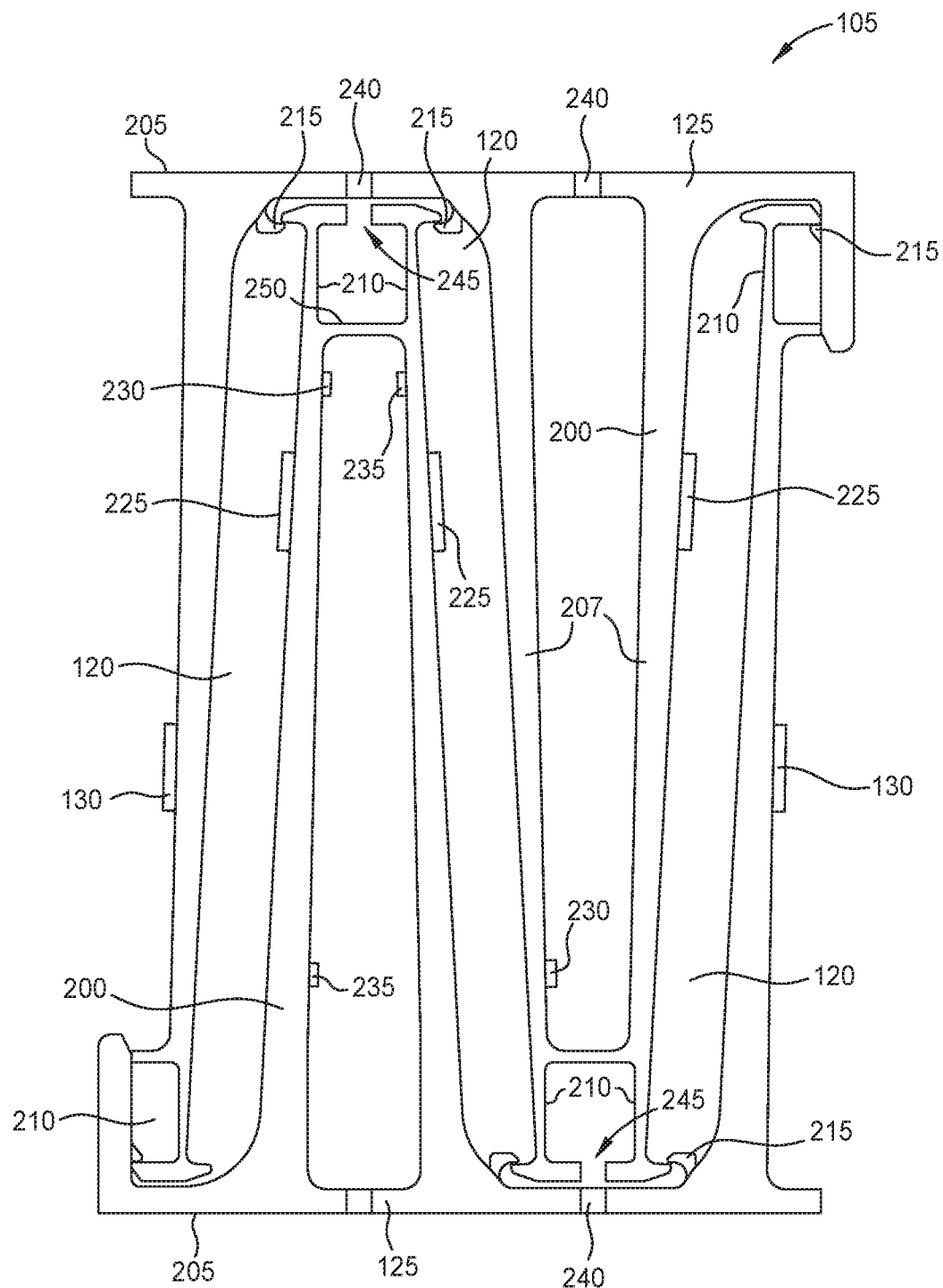
FIG. 2A is a sectional view of a spar without the batteries.
Figure 2B:
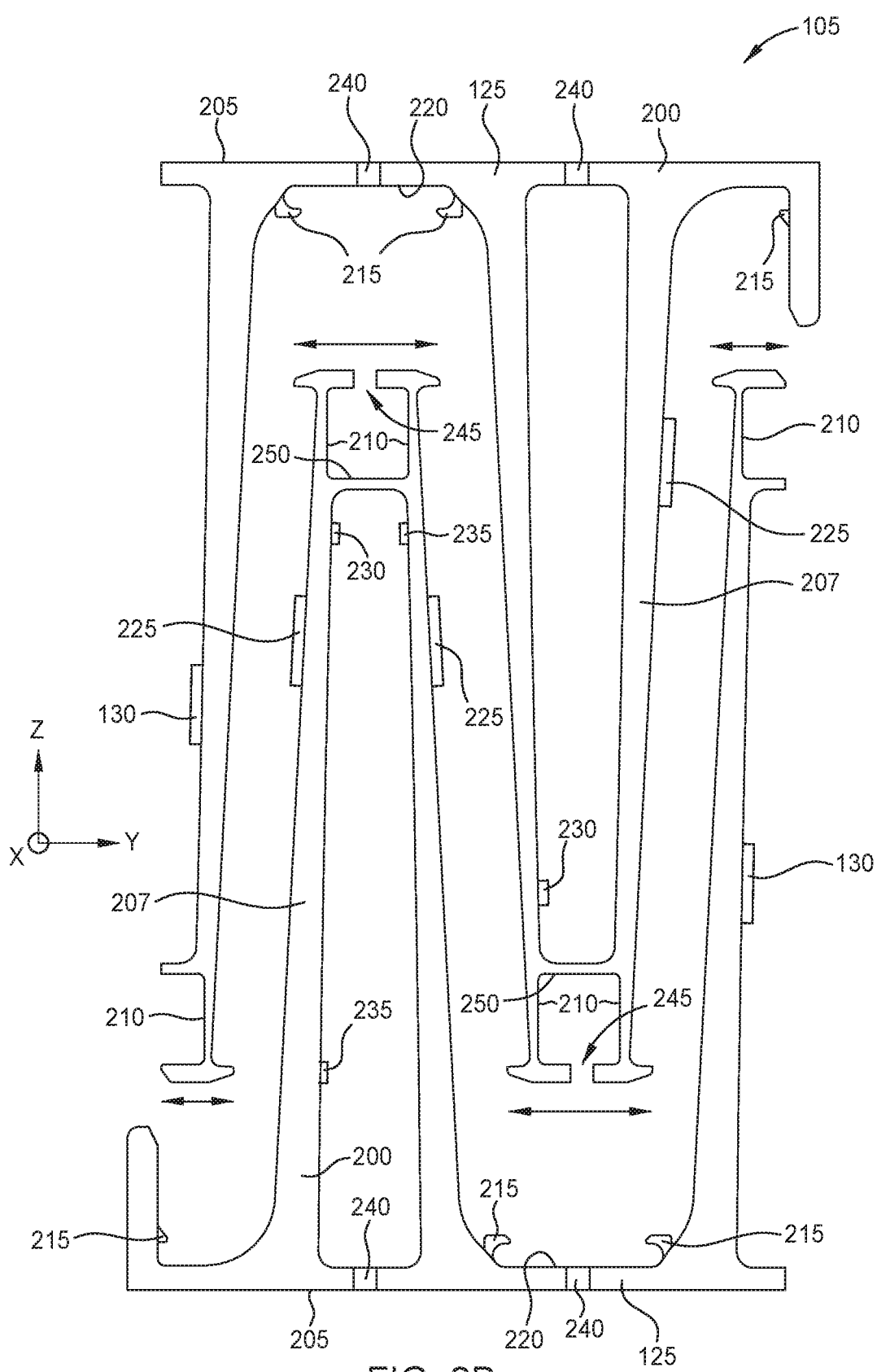
FIG. 2B is a sectional exploded view of the spar of FIG. 2A.
Figure 3:
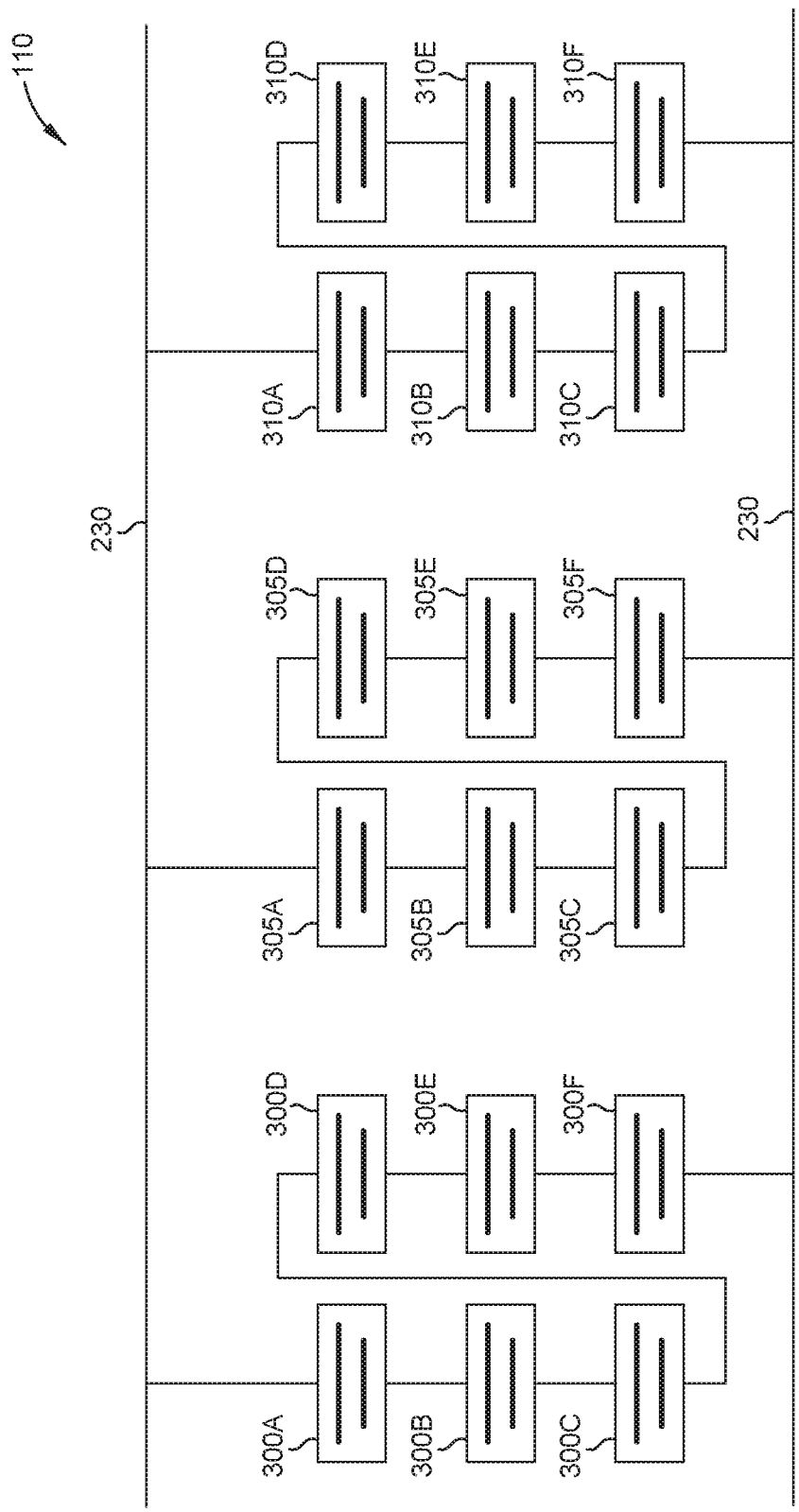
FIG. 3 is a schematic diagram of one embodiment of the onboard energy subsystem as disclosed herein.

FIG. 2A is a sectional view of the spar 105 without the batteries 115 and FIG. 2B is a sectional exploded view of the spar 105 of FIG. 2A. The spar 105 includes the plurality of finned spar members 125 as shown in FIG. 1. In the embodiment shown, the spar 105 includes two finned spar members 125 that snap together to form the spar 105 as shown in FIG. 2A. In FIG. 2B, the two finned spar members 125 are separated in a manner where the batteries 115 can be installed or removed.

In the embodiment of FIGS. 2A and 2B, the finned spar members 125 are substantially identical and can be interchanged with each other. Each of the finned spar members 125 includes a main body 200 and a flange 205. A portion of the main body 200 includes a plurality of web members 207 that extend from the flange 205. The main body 200 can be considered as a web that couples to the flange 205. When the finned spar members 125 are coupled together as shown in FIG. 2A, the main bodies 200 and the flanges 205 form an "I" beam like support member.

Each of the finned spar members 125 include a plurality of flexible portions 210 that flex and rebound in the direction of the arrows in FIG. 2B. The flexible portions 210 compress and couple to retaining members 215 formed on an inner surface 220 (shown in FIG. 2B) of the flanges 205. To interlock the finned spar members 125, one finned spar member 125 is rotated 180 degrees along the length direction thereof (the X axis as shown in FIG. 2B) and fastened together.

Circuitry for the onboard energy subsystem 110 shown in FIG. 1 is illustrated schematically in FIGS. 2A and 2B. For example, conductors 225 are coupled to or formed in the main bodies 200 of each of the finned spar members 125. In addition, bus bars 230 are coupled to or integrated with the main bodies 200 of each of the finned spar members 125. In the embodiments where the finned spar members 125 are made of metallic materials or include an electrically conductive material (such as carbon fibers), a dielectric layer (not shown) may be provided between the main bodies 200 of each of the finned spar members 125 and the conductors 225 to electrically insulate the conductors 225 from the finned spar members 125.

Additionally, in some embodiments, the finned spar members 125 include electrical generating devices 235 embedded therein or thereon. The electrical generating devices 235 may be connected to the onboard energy subsystem 110 via the power management devices 130. Each of the electrical generating devices 235 are utilized to generate electricity from structural bending of the spar 105, such as when the spar 105 of the wing 100 bends during flight. Each of the electrical generating devices 235 may be piezoelectric devices.

Each of the finned spar members 125 include openings 240 formed in the flanges 205. The openings 240 may be utilized to reduce the weight of the spar 105. The openings 240 are also used to attach the wing 100 to the spar 105. Slots 245 are also formed in the main bodies 200 of each of the finned spar members 125. The slots 245 are utilized to provide lateral movement of the flexible portions 210 when connecting or disconnecting the finned spar members 125. Spacers 250 may be provided between the flexible portions 210.

FIG. 3 is a schematic diagram of one embodiment of the onboard energy subsystem 110 as disclosed herein. The onboard energy subsystem 110 includes a plurality of circuit boards shown as a first set of circuit boards 300A-300F, a second set of circuit boards 305A-305F and a third set of circuit boards 310A-310F. The first set of circuit boards 300A-300F, the second set of circuit boards 305A-305F and the third set of circuit boards 310A-310F are the conductors 225 formed in or on the finned spar members 125 shown in FIGS. 2A and 2B. The bus bars 230 are also shown in FIG. 3 and may be formed in or on the finned spar members 125 as shown in FIGS. 2A and 2B.

Each of the first set of circuit boards 300A-300F, the second set of circuit boards 305A-305F and the third set of circuit boards 310A-310F include metallic conductors formed in or on the finned spar members 125 as the conductors 225 shown in FIGS. 2A and 2B. The first set of circuit boards 300A-300F, the second set of circuit boards 305A-305F and the third set of circuit boards 310A-310F, and the bus bars 230, may be aluminum, copper, or some other conductive material.

Each of the circuit boards 300A-300F, 305A-305F and 310A-310F may be other standalone electronic devices, such as microcontrollers, sensors, or any other sort of electronic device.

Each of the individual circuit boards of the first set of circuit boards 300A-300F, the second set of circuit boards 305A-305F and the third set of circuit boards 310A-310F are connected in series and the collective sets are connected to the bus bars 230 in parallel. While only three sets of circuit boards are shown, addition sets of circuit boards may be provided along the length of the spar 105 (shown in FIG. 1). The bus bars 230 may carry power as well as data.

Figure 4:
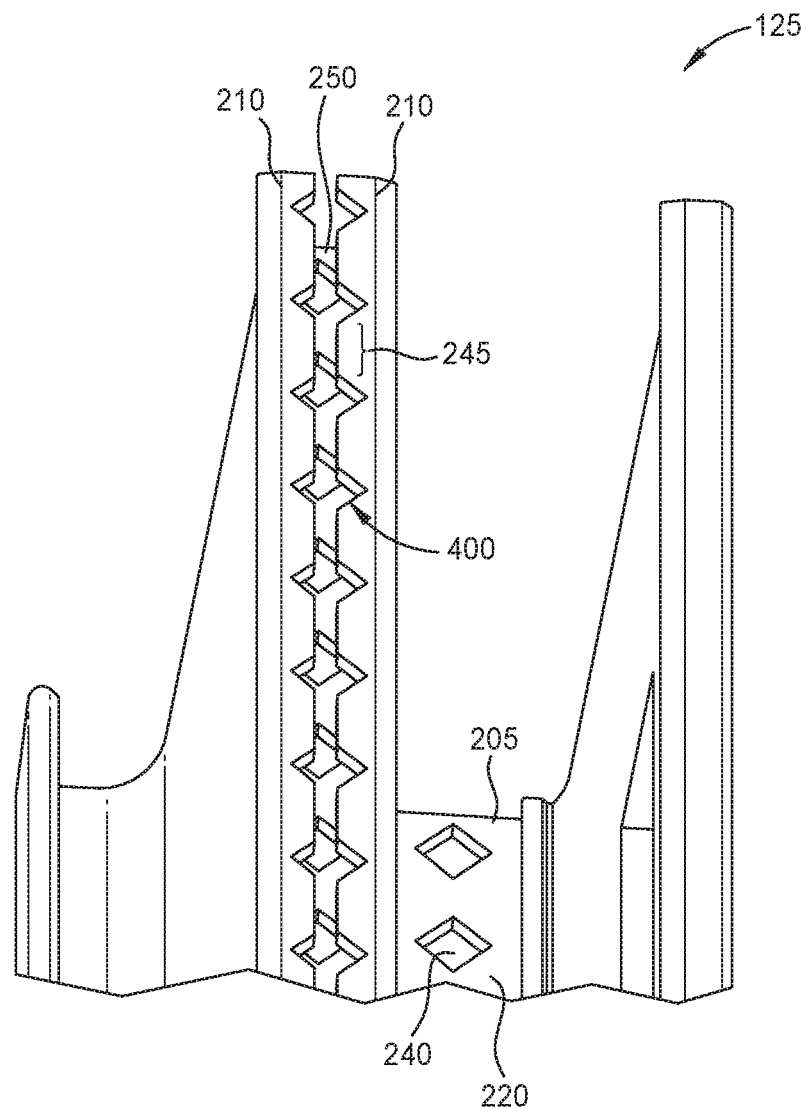
FIG. 4 is an isometric view of one of the finned spar members.

FIG. 4 is an isometric view of one of the finned spar members 125. A plurality of first openings 240 are shown on the flange 205. The slots 245 and the spacers 250 are shown adjacent to the flexible portions 210. A plurality of second openings 400 are also shown between the slots 245. The second openings 400 are similar to the first openings 240. The first openings 240 of one finned spar member 125 substantially align with the second openings 400 of another finned spar member 125 when assembled into the spar 105. A portion of the first openings 240 and the second openings 400 are utilized for fasteners used to attach the wing 100 to the spar 105.

In some embodiments, an apparatus comprising a structural member for a vehicle, such as an aircraft, having an onboard energy subsystem 110 is disclosed herein. In other embodiments, a method for an onboard energy subsystem 110 is disclosed. The method includes attaching batteries to a finned spar member 125, attaching the finned spar member 125 and the batteries together to form a spar 105, and attaching the spar 105 to an aircraft, wherein the attachment forms an electrical connection between the batteries in the spar 105 and an electrical system of the aircraft.

Example Embodiments

The following are example embodiments. Notably, the reference numerals in the examples below are merely examples. Further, even if single claim dependencies are indicated in the following examples, or in the claims below, all claim dependencies, including multiple claim dependencies, are included within the scope of the present disclosure.

Embodiment 1: A structural member for a vehicle, the structural member comprising a plurality of finned spar members (125) interlocked with one another, wherein each of the finned spar members include a main body (200); a plurality of web members (207) extending from a flange (205); a circuit board (300A-300F, 305A-305F and 310A-310F) provided on the main body; and a bus bar (230) provided on the main body in electrical communication with the circuit board, wherein a compartment (120) is formed between adjacent web members, each compartment being sized to receive a battery (115).

Embodiment 2: The structural member of Embodiment 1, wherein the structural member is an aircraft spar (105).

Embodiment 3: The structural member of Embodiment 1, wherein each of the plurality of web members includes a flexible portion (210) that flexes and rebounds.

Embodiment 4: The structural member of Embodiment 3, wherein the flexible portion interfaces with retaining members (215) formed adjacent to the flange.

Embodiment 5: The structural member of Embodiment 1, further comprising a plurality of conductors (225) formed on the finned spar members that are coupled to the bus bar.

Embodiment 6: The structural member of Embodiment 1, wherein the plurality of finned spar members comprises a first finned spar member and a second finned spar member and each of the first finned spar member and the second finned spar member are substantially identical.

Embodiment 7: The structural member of Embodiment 6, wherein the first finned spar member is rotated 180 degrees relative to the second finned spar member along a length direction of the first finned spar member in the interlocked position.

Embodiment 8: The structural member of Embodiment 6, wherein a plurality of first openings are (240) formed in the flange of the first finned spar member and a plurality of second openings (400) are formed in the flange of the second finned spar member, at least a portion of the openings are adapted to receive a fastener that couples to a wing.

Embodiment 9: The structural member of Embodiment 8, wherein each of the plurality of first openings substantially align with each of the plurality of second openings in the interlocked position.

Embodiment 10: An aircraft spar (105), comprising a plurality of finned spar members 125 interlocked with one another, wherein each of the finned spar members include a main body (200); a plurality of web members (207) extending from a flange (205); a circuit board (300A-300F, 305A-305F and 310A-310F) affixed to the main body; and a bus bar (230) formed on the main body, wherein a compartment (120) is formed between adjacent web members, each compartment being sized to receive a plurality of batteries (115).

Embodiment 11: The aircraft spar of Embodiment 10, wherein each of the plurality of web members includes a flexible portion (210) that flexes and rebounds and is configured to attach to a retaining member (215) of the flange.

Embodiment 12: The aircraft spar of Embodiment 11, wherein the flexible portion comprises two flexible portions and a slot (245) is provided therebetween.

Embodiment 13: The aircraft spar of Embodiment 10, further comprising a plurality of conductors (225) formed on the finned spar members that are coupled to the bus bar.

Embodiment 14: The aircraft spar of Embodiment 10, wherein the plurality of finned spar members comprises a first finned spar member and a second finned spar member that are substantially identical to each other.

Embodiment 15: The aircraft spar of Embodiment 14, wherein the first finned spar member is rotated 180 degrees relative to the second finned spar member along a length direction of the first finned spar member in the interlocked position.

Embodiment 16: An onboard energy subsystem (110) for a vehicle, the onboard energy subsystem comprising a structural member (105) comprising a plurality of batteries (115), wherein the structural member comprises a plurality of finned spar members (125) interlocked with one another, wherein each of the finned spar members include a main body (200); a plurality of web members (207) extending from a flange (205); a circuit board (300A-300F, 305A-305F and 310A-310F) formed on the main body; and a bus bar (230) provided on the main body, wherein a battery of the plurality of batteries is compressed in a compartment (120) formed between adjacent web members.

Embodiment 17: The onboard energy subsystem of Embodiment 16, wherein multiple groups of the plurality of batteries are connected in series along the structural member.

Embodiment 18: The onboard energy subsystem of Embodiment 17, wherein the multiple groups of the plurality of batteries are connected in parallel to the bus bar.

Embodiment 19: The onboard energy subsystem of Embodiment 16, further comprising a power management device (130) coupled to the structural member coupled with the plurality of batteries and the bus bar.

Embodiment 20: The onboard energy subsystem of Embodiment 16, further comprising a plurality of electrical generating devices (235) coupled to the structural member.

The preceding description is provided to enable any person skilled in the art to practice the various embodiments described herein. The embodiments and examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A structural member for a vehicle, the structural member comprising:
   a plurality of finned spar members directly interlocked with one another, wherein each of the finned spar members include:
      a main body;
      a plurality of web members extending from a flange, wherein each of the plurality of web members includes a flexible portion;
      retaining members formed on the flange and configured to directly interlock each of the finned spar members of the plurality of finned spar members, wherein the flexible portion is configured to flex and rebound to compress and couple to the retaining members;
      a circuit board formed on the main body; and
      a bus bar formed on the main body in electrical communication with the circuit board,
      wherein a compartment is formed between adjacent web members of different finned spar members of the plurality of finned spar members when directly interlocked with one another, and
      wherein the compartment is sized to receive a battery.

2. The structural member of claim 1, wherein the structural member is an aircraft spar.

3. The structural member of claim 1, further comprising a plurality of batteries disposed in each compartment formed between adjacent web members.

4. The structural member of claim 1, further comprising a plurality of conductors formed on the finned spar members that are coupled to the bus bar.

5. The structural member of claim 1, wherein the plurality of finned spar members comprises a first finned spar member and a second finned spar member and each of the first finned spar member and the second finned spar member are identical.

6. The structural member of claim 1, wherein the plurality of finned spar members comprises a first finned spar member and a second finned spar member and the first finned spar member is rotated 180 degrees relative to the second finned spar member along a length direction of the first finned spar member in the interlocked position.

7. The structural member of claim 1, wherein:
   the plurality of finned spar members comprises a first finned spar member and a second finned spar member; and
   a plurality of first openings are formed in the flange of the first finned spar member and a plurality of second openings are formed in the flange of the second finned spar member, at least a portion of the plurality of first openings and the plurality of second openings are adapted to receive a fastener that couples to a wing.

8. The structural member of claim 7, wherein each of the plurality of first openings align with each of the plurality of second openings in the interlocked position.

9. An aircraft spar, comprising:
   a plurality of finned spar members directly interlocked with one another, wherein each of the finned spar members include:
      a main body;
      a plurality of web members extending from a flange;
      retaining members formed on the flange and configured to directly interlock each of the finned spar members of the plurality of finned spar members;
      a circuit board affixed to the main body; and
      a bus bar formed on the main body, wherein a compartment is formed between adjacent web members of different finned spar members of the plurality of finned spar members when directly interlocked with one another; and
   a plurality of batteries disposed in each compartment formed between the adjacent web members.

10. The aircraft spar of claim 9, wherein each of the plurality of web members includes a flexible portion that is configured to flex and rebound to compress and couple to a retaining member of the flange to directly interlock each of the finned spar members of the plurality of finned spar members.

11. The aircraft spar of claim 10, wherein the flexible portion comprises two flexible portions and a slot is provided therebetween.

12. The aircraft spar of claim 11, wherein the flexible portion further comprises a spacer between the two flexible portions.

13. The aircraft spar of claim 9, further comprising a plurality of conductors formed on the finned spar members that are coupled to the bus bar.

14. The aircraft spar of claim 9, wherein the plurality of finned spar members comprises a first finned spar member and a second finned spar member that are identical to each other.

15. The aircraft spar of claim 9, wherein:
   the plurality of finned spar members comprises a first finned spar member and a second finned spar member, and
   the first finned spar member is rotated 180 degrees relative to the second finned spar member along a length direction of the first finned spar member in the interlocked position.

16. An onboard energy subsystem for a vehicle, the onboard energy subsystem comprising:
   a structural member comprising a plurality of batteries, wherein the structural member comprises:
      a first finned spar member directly interlocked with a second finned spar member, wherein each of the first and second finned spar members include:
         a main body;
         a plurality of web members extending from a flange;
         retaining members formed on the flange and configured to directly interlock the first finned spar member to the second finned spar member;
         a circuit board formed on the main body; and
         a bus bar provided on the main body,
      wherein:

the first finned spar member is rotated 180 degrees relative to the second finned spar member along a length direction of the first finned spar member in the interlocked position, and a battery of the plurality of batteries is compressed in a compartment formed between adjacent web members.

17. The onboard energy subsystem of claim 16, wherein multiple groups of the plurality of batteries are connected in series along the structural member.

18. The onboard energy subsystem of claim 17, wherein the multiple groups of the plurality of batteries are connected in parallel to the bus bar.

19. The onboard energy subsystem of claim 16, further comprising a power management device coupled to the structural member coupled with the plurality of batteries and the bus bar.

20. The onboard energy subsystem of claim 16, further comprising a plurality of electrical generating devices coupled to the structural member.

21. The onboard energy subsystem of claim 16, wherein each of the plurality of web members includes a flexible portion that is configured to flex and rebound to compress and couple to a retaining member of the flange to directly interlock the first finned spar member to the second finned spar member.

* * * * *